No. 774,954. PATENTED NOV. 15, 1904.
C. F. SCOTT.
METHOD OF ROTATING FIELD MAGNETS OF DYNAMO ELECTRIC MACHINES.
APPLICATION FILED SEPT. 16, 1903.
NO MODEL.

WITNESSES:
C. L. Belcher
Fred. H. Miller.

INVENTOR
Charles F. Scott
BY Wesley G. Carr
ATTORNEY.

No. 774,954.

Patented November 15, 1904.

UNITED STATES PATENT OFFICE.

CHARLES F. SCOTT, OF EDGEWOOD PARK, PENNSYLVANIA, ASSIGNOR TO WESTINGHOUSE ELECTRIC & MANUFACTURING COMPANY, A CORPORATION OF PENNSYLVANIA.

METHOD OF ROTATING FIELD-MAGNETS OF DYNAMO-ELECTRIC MACHINES.

SPECIFICATION forming part of Letters Patent No. 774,954, dated November 15, 1904.

Application filed September 16, 1903. Serial No. 173,481. (No model.)

*To all whom it may concern:*

Be it known that I, CHARLES F. SCOTT, a citizen of the United States, and a resident of Edgewood Park, in the county of Allegheny and State of Pennsylvania, have invented a new and useful Improvement in Methods of Rotating Field-Magnets of Dynamo-Electric Machines, of which the following is a specification.

My invention relates to the operation of dynamo-electric machines which are directly connected to the engines by which they are driven in commercial service; and it has for its object to provide a method whereby the rotary field-magnets of such machines may be conveniently and inexpensively rotated at slow speeds and either continuously or intermittingly in order to adjust the engines with reference thereto.

In the installation of a large polyphase generator and the engine for driving the same it is necessary to carefully adjust the engine so that the operation when final connection is made will be satisfactory, and in order to effect such adjustment it is necessary to rotate the field-magnet of the generator at a slow speed and under such control that it may be readily started and stopped when desired. This slow and controlled rotation has heretofore been generally effected by means of an electric motor and suitable gearing between the same and the field-magnet of the generator. This has been an expensive and not altogether satisfactory method, for the reason that the inertia of the field-magnet is very great, and consequently a very large current is taken by the operating-motor in starting the rotation of the field-magnet.

I propose to effect such slow and controlled rotation by means of direct current applied to the several windings of the armature of the generator in such order and in such amounts as to effect the desired degree and rate of rotation.

I have illustrated means for practicing my invention in the accompanying drawings, in which—

Figure 1:
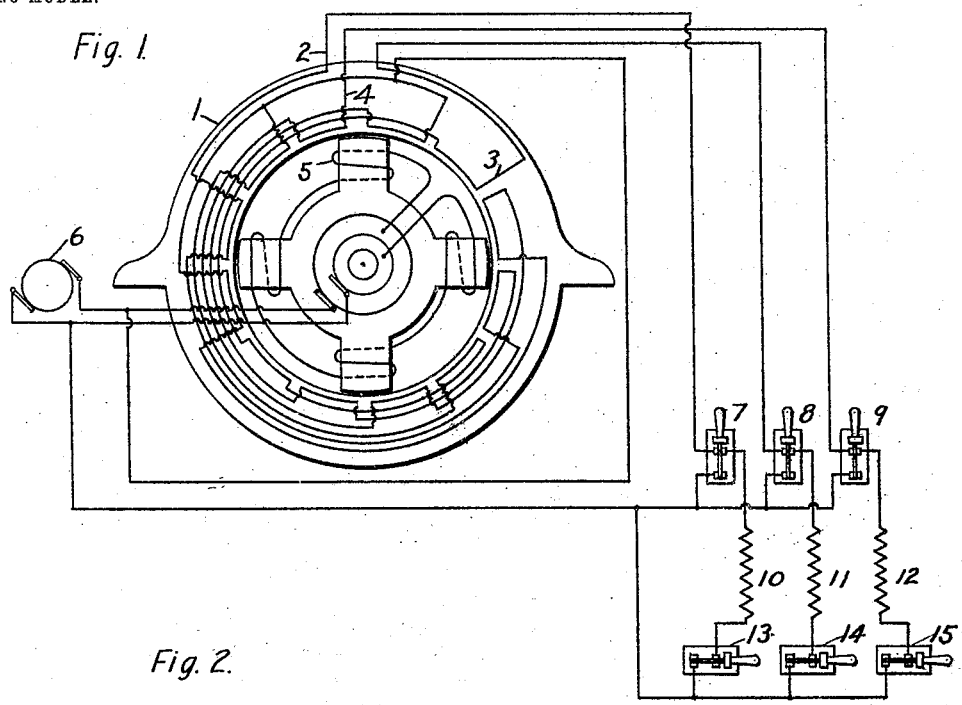
Figure 2:
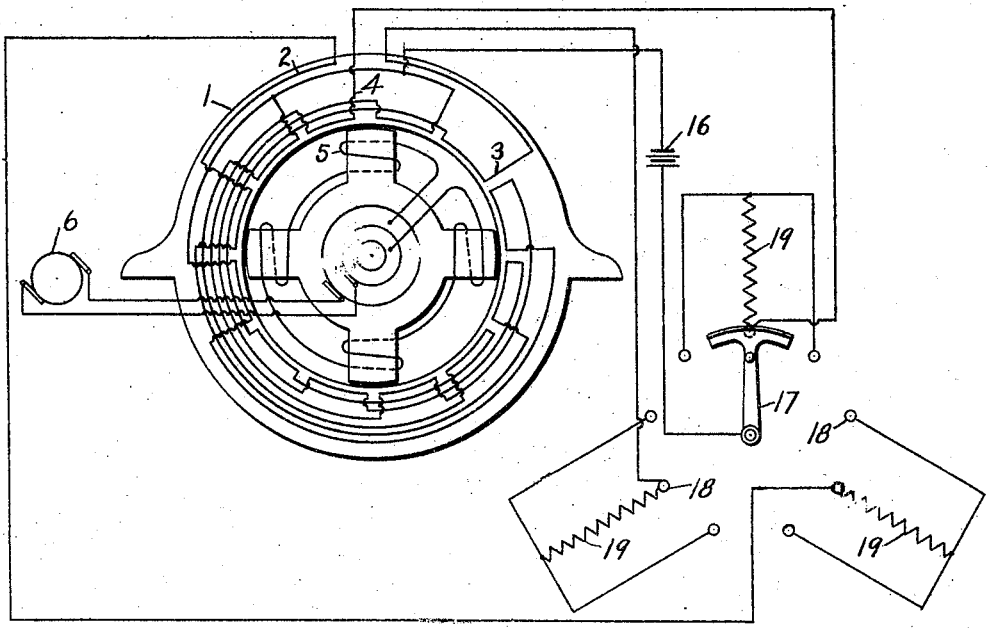

Figure 1 is a diagram of a three-phase generator and means for applying direct-current energy to the armature-windings successively, and Fig. 2 is a diagram illustrating a modified means for controlling the application of the energy to the armature-windings.

Referring first to Fig. 1, the polyphase generator 1 is shown as provided with three star-connected armature-windings 2, 3, and 4, the field-magnet being represented by a winding 5, to which is connected a direct-current exciter 6. The current from the exciter 6 is here indicated as utilized for the desired slow rotation of the field-magnet, and in order to apply the energy from this exciter in the desired manner I provide three switches 7, 8, and 9, which are connected in parallel to one terminal of the generator 6 and are respectively connected by stationary contact-terminals to the outer terminals of the armature-windings 2, 3, and 4, the inner terminals of the windings 2, 3, and 4 being connected to the other terminal of the dynamo 6. In order to prevent the formation of arcs when the switches 7, 8, and 9 are open, I provide a set of preventive resistances 10, 11, and 12, one terminal of each of which is connected to one terminal of the corresponding switch above described and the other terminal of which is respectively connected to another switch, these lattter switches being designated as 13, 14, and 15 and having corresponding terminals all connected in parallel to one terminal of the generator 6, this arrangement being such that when one of the switches 7, 8, and 9 is opened it may throw the circuit onto the corresponding preventive resistance through its switch and then the corresponding switch 13, 14, or 15, as the case may be, may be opened. By means of this arrangement current from the generator 6 may be supplied to the windings 2, 3, and 4 successively, and the magnetic field thus set up will act upon the field-magnet in such manner and to such degree as to effect a certain degree of partial rotation thereof, and if a continuous rotation is desired the switches may be manipulated to throw the current onto the next winding in the armature and then the third one, and so on, thereby producing a progressively-rotating field which will act upon the field-magnet to effect its mechanical rotation.

In Fig. 2 I have shown the generator 6 as utilized solely for exciting the field-magnet winding 5 and have shown a separate source of energy 16 for energizing the armature-windings 2, 3, and 4. In this figure I have also shown a controlling device comprising a movable contact-arm 17, to which one terminal of the source of current 16 is connected, and a series of stationary contact-terminals 18 so connected to each other and to a set of resistances 19 that the current supplied by the source 16 is applied successively to the windings 2, 3, and 4 and also so that in passing from one winding to the next the resistance 19 may be so utilized as to decrease the current in the winding last energized and decrease that in the next succeeding winding, thereby creating a more nearly constant rotative effect on the field-magnet.

Other means for practicing the invention as regards details of construction may obviously be employed, and I therefore desire it to be understood that my invention is not limited by any structural details except in so far as the requirements of practical service may impose limitations.

I claim as my invention—

1. The method of rotating the field-magnet of a polyphase alternating-current generator which consists in energizing the several armature-windings by means of direct current successively.

2. The method of rotating the field-magnet of an alternating-current generator having polyphase armature-windings which consists in controllably supplying direct currents to the armature-windings in such amounts and in such order as will insure the direction and speed of rotation desired.

3. The method of rotating the field-magnet of an alternating-current generator having polyphase armature-windings which consists in supplying direct currents to the several armature-windings successively and at the same time so varying the current as to produce a substantially continuous motion of the field-magnet.

4. The method of rotating the field-magnet of a polyphase alternating-current generator which consists in successively energizing the armature-windings by a regulated direct current whereby progressive, rotative impulses are imparted to the field-magnet.

5. The method of rotating the field-magnet of a polyphase, alternating-current generator which consists in controllably energizing the armature-windings in a predetermined order and relation by direct currents.

In testimony whereof I have hereunto subscribed my name this 1st day of September, 1903.

CHAS. F. SCOTT.

Witnesses:
J. C. DIECKMANN,
BIRNEY HINES.